Feb. 16, 1943. R. J. LAUER 2,310,963
VALVE
Filed Sept. 23, 1939
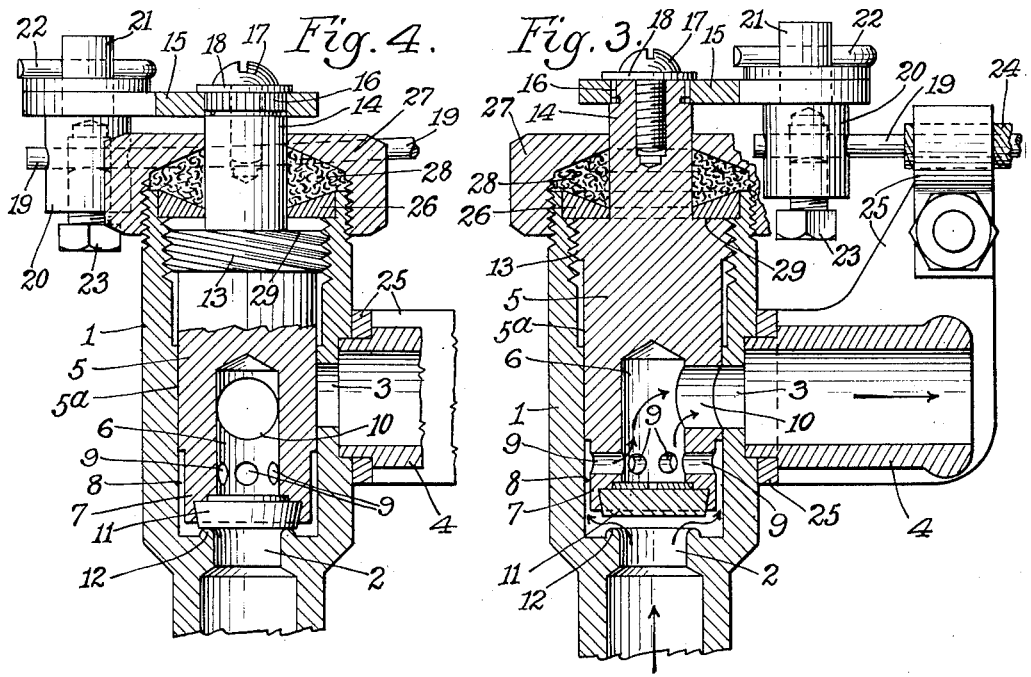
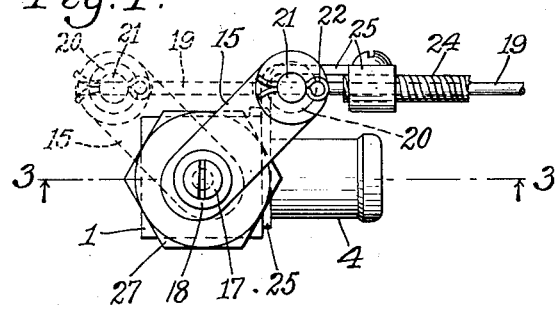
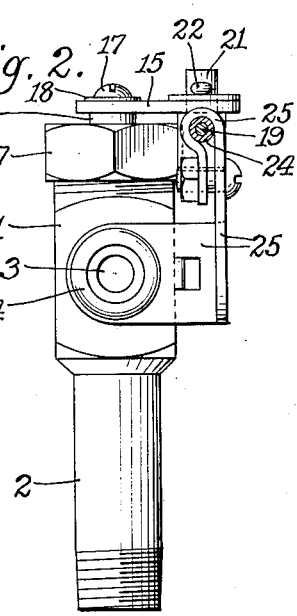
Inventor.
Raymond J. Lauer.
by Parker & Carter
Attorneys.

Patented Feb. 16, 1943

2,310,963

UNITED STATES PATENT OFFICE 2,310,963

VALVE

Raymond J. Lauer, Cicero, Ill., assignor to The Dole Valve Company, Chicago, Ill., a corporation of Illinois Application September 23, 1939, Serial No. 296,272

4 Claims. (Cl. 251—43)

This invention relates to valves and has for its object to provide a new and improved device of this description.

The invention has as a further object to provide a valve particularly adapted for controlling the liquid for supplying a hot water heater installed in the circulatory system of an internal combustion engine. The invention has as a further object to provide such a valve for use in connection with a hot water heater of the type described for use in an automobile wherein the valve is operated by a control device in proximity to the driver's seat. The invention has an a further object to provide a valve of the kind described which is operated by means of a wire extending to a point in proximity to the driver's seat.

The invention has as a further object to provide a valve of the kind described which shall be quick acting in its movement to its open and closed positions. The invention has as a further object to provide a valve of the kind described where the movement of the controlling handle from closed to open position is less than one hundred and eighty degrees and preferably substantially ninety-five degrees.

The invention has further objects which are more particularly pointed out in the accompanying description.

Referring now to the drawing,

Fig. 1 is a plan view of one form of valve embodying the invention;

Fig. 2 is a side view of the valve shown in Fig. 1;

Fig. 3 is an enlarged sectional view taken on line 3—3 of Fig. 1, showing the valve open; and Fig. 4 is a view similar to Fig. 3, showing the valve closed.

Like numerals refer to like parts throughout the several figures.

As herein shown the valve is provided with a casing 1 having an inlet 2 and an outlet 3 connected with the pipe section 4 by means of which the valve is connected in the circulatory system. Within the casing is a valve member 5 provided at its end with a hollow portion or recess 6. The valve member has an end portion 7 reduced in size so as to provide a space 8 around the lower end of the valve member. There are a plurality of lateral passageways 9 which connect the space 8 with the recess 6. There is a lateral passageway 10 which connects the hollow portion or recess 6 with the outlet 3 of the valve casing.

The valve member 5 is provided with a seating portion 11 which is imperforate and which is preferably of non-metallic material, such as neoprene or any other suitable material. A seat 12 surrounds the inlet 2 and is engaged by the seating portion 11 when the valve is closed, to shut off the passage of liquid through the valve. It will be noted that the valve member is cylindrical in shape, although it has different diameters, and that the seating of the valve is at the end and not around the periphery. By means of this construction the valve is easily moved to its open and closed positions, there being no binding effect produced, as is the case where a tapered valve member is used, as has formerly been the practice in this art.

Some means is provided for moving the valve member to its open and closed positions. As herein shown, the valve member is provided with a quick opening and closing thread 13 which engages a similar thread on the interior of the valve casing. The valve member 5 is provided with a stem 14 to which is attached a handle 15. Some means is preferably provided for adjusting the position of the handle with the valve stem. As herein shown, this is secured by providing the valve stem with the serrations 16. The handle 15 is provided with an opening having similar serrations. The handle is held in position by means of a screw 17 and a washer 18.

A controlling wire 19 is connected with the handle 15 in any suitable manner. As herein shown, the wire is connected to a member 20 which has a reduced end portion 21 passing through an opening in the handle, the member 20 being held in position by the fastening member 22 extending through the reduced portion 21. The wire 19 passes through an opening in the member 20 and is held in position by the screw 23. The wire 19 passes through a guide tubing 24 one end of which is attached to a bracket 25 connected with the valve casing 1. As herein shown, this bracket surrounds the pipe section 4 and is held in place thereby, as shown in Figs. 3 and 4.

A packing device is provided for the valve stem 14, which as herein shown consists of the packing washer 26 and the cap or closing member 27, with the packing 28 between them. When the valve member is in its maximum open position, the face 29 engages the washer 26 so as to stop any further opening movement. The parts are preferably arranged so that the movement of the valve member is stopped when the handle 15 is moved substantially ninety-five degrees from its closed position. The wire 19 leads to the point of control near the driver's seat, as, for example, by having its end in proximity to the panel board.

I have described in detail a particular construction embodying the invention, but it is evident that the parts may be varied in many particulars without departing from the spirit of the invention as embodied in the claims hereto appended, and I therefore do not limit myself to the particular construction shown.

The use and operation of my invention are as follows.

When the valve, for example, is connected in the circulatory cooling system of an internal combustion engine, so as to control the liquid passing through a heater heated by the liquid which is used to cool the engine, and it is desired to open the valve to admit the hot liquid to the heater, the driver pulls on the wire 19. This moves the handle 15 from the dotted position shown in Fig. 1 to the full line position. The movement of the handle and the valve member is stopped by the face 29 of the valve member engaging the washer 26. This causes the valve member 5 and the seating member 11 to be moved away from the seat 12 surrounding the admission opening 2. The liquid then passes through the admission opening and into the space 8 surrounding the end of the valve member and then into the lateral passageways 9 into the hollow portion or recess 6 of the valve member and then through the lateral passageway 10 to and out through the discharge of the casing 3 to the point of use.

When it is desired to close the valve, the driver pushes upon the wire 19 and moves the handle 15 from the full line position to the dotted line position of Fig. 1. This causes the seating portion 11 to securely engage the seat 12 and close the passage of liquid through the valve. The further movement of the valve member is thus stopped by the engagement of the seating member 11 and the seat 12.

The parts are preferably arranged so that the maximum movement of the handle 15 is ninety-five degrees. It will be seen that by means of this construction the valve is easily moved to its open and closed positions so that a wire can be used for this purpose, as there is no binding of the parts and the movement of the valve is positively stopped when it reaches its fully open position and when it reaches its fully closed position. It will further be seen that the liquid may be partially closed off by simply moving the handle 15 to some intermediate position between its fully open and fully closed positions, to meter the liquid.

In this construction there is a rotatable and longitudinally movable valve member with a closed end which engages the seat of the inlet and there is a fluid connection extending between the inlet and the outlet when the valve is open, a portion of said fluid connection extending along the exterior of the valve member. It will further be seen that it requires a rotatable and longitudinal movement of the valve member to render the connection between the inlet and the outlet operative.

By means of this construction the valve body has a long engaging face 5a which engages the interior of the casing, so as to properly hold the valve member against wobbling, and prevents binding of the parts, the valve member being held properly in all its various positions by a holding face intermediate the ends of the valve member. This permits the valve to be easily moved by means of a wire, as there is no binding of the valve member in any of its positions. The parts are arranged so that the movement of the handle should be something less than one hundred and eighty degrees and the preferable maximum movement is substantially ninety-five degrees.

I claim:

1. A valve comprising a casing having an inlet and an outlet, a valve seat in proximity to said inlet, a rotatable and longitudinally movable valve member in said casing, a valve stem fixed to said valve member, a recess in said valve member at one end thereof, the end of the valve member in proximity to said recess being closed, said valve member having a seating portion which engages said valve seat, the valve member having a central cylindrical portion in slidable engagement with the inner surface of the valve casing, the end portion of the valve member beyond said cylindrical portion, in proximity to said seating portion, being smaller in diameter than the valve casing, to provide a space between the valve member and the casing, a passageway connecting said recess with said space and at all times out of alignment with said outlet, a second passageway spaced apart from said first mentioned passageway and in alignment with said outlet only when the valve is in its open position and connecting said recess with said outlet, so that when the valve member is rotated and moved longitudinally to its open position, liquid passes from said inlet to said outlet, and means for rotating said valve member a partial rotation to move said valve member to its fully open position.

2. A valve for controlling the heating liquid for a hot water heater for automobiles, comprising a casing having an inlet and an outlet, a valve seat surrounding said inlet, a valve member mounted in and having a screwthreaded connection with said casing, having a closed inner end adapted to be moved into contact with said valve seat to close the valve, said valve member having a part opposed to said outlet which tightly fits the casing and a part near its end and below said outlet which is out of engagement with said casing and a fluid connection extending through the valve member to said outlet, rendered operative when the valve member is rotated to move it longitudinally away from the valve seat, said fluid connection having its admission end opposite the portion of the valve member out of contact with the casing and having its discharge opposite that portion of the valve member in contact with the casing.

3. A valve for controlling the heating liquid for a hot water heater for automobiles, comprising a casing having an inlet and an outlet spaced apart longitudinally of the casing, said outlet located intermediate the ends of the casing, a valve seat surrounding said inlet, a movable valve member mounted in and having a screw threaded connection with said casing, said valve member having a longitudinally extending recess closed at its upper end and extending to a point near the lower end and provided with a closed lower end for engaging said seat to close the valve, said valve member having a central cylindrical portion in slidable engagement with the inner surface of the valve casing and having a portion thereof near the closed lower end out of contact with the casing and provided with an admission opening connecting with said recess, means for maintaining said admission opening out of alignment with said outlet at all times, a separate discharge opening connected with said recess and located opposite said outlet only when the valve is in its open position.

4. A valve for controlling the heating liquifor a hot water heater for automobiles, comprising a casing having an inlet and an outlet, a valve seat surrounding said inlet, a movable valve member mounted in and having a screwthreaded connection with said casing, said valve member having a closed inner end adapted to be moved into contact with said valve seat to close the valve, and a fluid connection extending through the valve member to said outlet, said fluid connection having an admission end in a plane below said outlet and a discharge end above said admission end and in a plane opposite said outlet, said fluid connection rendered operative when the valve member is rotated to move it longitudinally away from the valve seat, said valve member having a smooth cylindrical engaging face intermediate its ends and which engages a cylindrical engaging face on the interior of the casing to maintain the valve member in proper alignment in all its various positions.

RAYMOND J. LAUER.